Feb. 28, 1950  M. B. DOWNER  2,498,796
LAWN MOWER
Filed Aug. 30, 1946
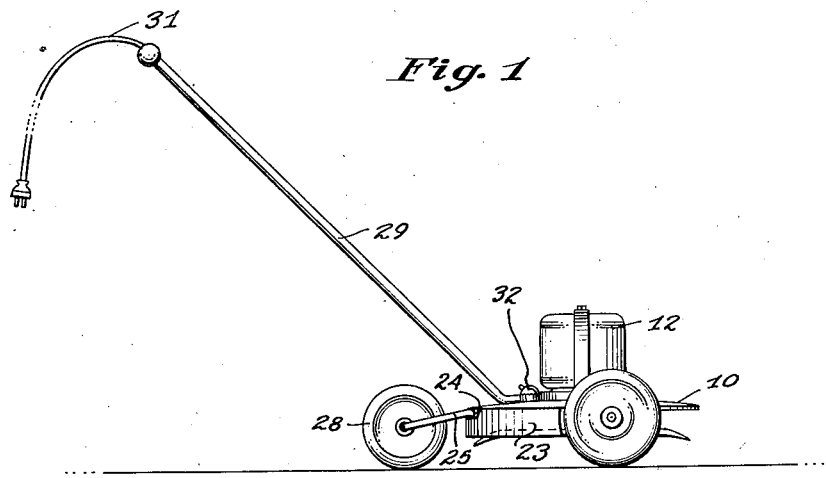
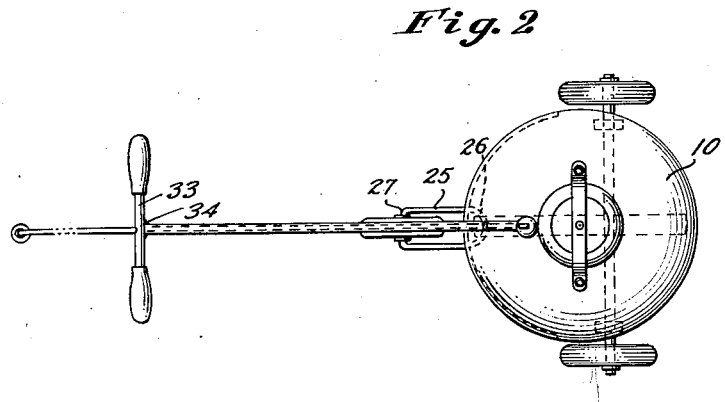
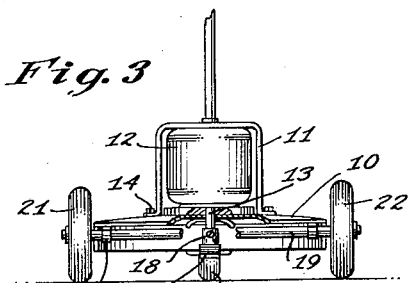
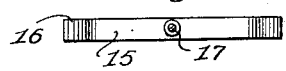
Inventor
MILTON B. DOWNER Patented Feb. 28, 1950

2,498,796

UNITED STATES PATENT OFFICE 2,498,796

LAWN MOWER

Milton B. Downer, Adrian, Mich.

Application August 30, 1946, Serial No. 693,959

1 Claim. (Cl. 56—25.4)

This invention relates to power lawn mowers, and more particularly to a lawn mower of a type including a rotating horizontal blade.

It is an object of the present invention to provide a simple and inexpensive lawn mower of the rotating horizontal blade type.

It is another object of the invention to provide a secure and simple means for the connection of the blade to the vertically extending motor shaft.

It is another object of the invention to provide a simple supporting frame to which all parts can be easily attached and which when attached will be confined in a minimum space and will be of simple and easily formed shape.

It is still another object of the invention to provide a simple connection for a rear wheel to the supporting frame plate.

It is still another object of the invention to provide a simple way of constructing a handle for use in pushing the operating mechanism of the lawn mower over the terrain and which is hollow to contain a cable for supplying current to the driving motor when attached to some remote current source.

For other objects and for a better understanding of the invention, reference may be had to the following detailed description taken in connection with the accompanying drawings, in which:

Figure 1 is a side elevational view of the lawn mower embodying the features of the present invention.

Figure 2 is a top plan view of the lawn mower.

Figure 3 is a front elevational view of the lawn mower with portions thereof broken away to show certain of the operating parts of the mower.

Figure 4 is a detail plan view of the horizontal cutter bar adapted for attachment with the vertically extending motor drive shaft.

Referring now to the figures, 10 is a supporting plate of circular shape which provides the main body part of the mower to which all of the various parts are attached either to the bottom or top of the same or to the rear edge thereof. Mounted on top of this plate and retained by a strap 11 is an electric motor 12 having a vertically extending drive shaft 13. The lower end of the motor housing rests upon the supporting plate and the strap 11 is U-shaped and extends over the top of the motor and has outwardly turned, apertured end portions connected to the supporting plate at opposite sides of the motor housing by bolts 14. The plate 10 is preferably dished with its concave face facing the ground. In the center of the plate is an opening through which the shaft 13 extends for connection with a horizontal cutting blade 15 having downturned ends 16. Welded to the top face of the blade 15 is a sleeve 17 adapted to be extended over the end of the shaft 13 and made secure thereto by a set screw 18. The plate 10 is supported upon an axle 19 having supporting wheels 21 and 22 at opposite sides thereof. This axle lies ahead of the motor shaft to support the forward portion of the plate 10. The axle is connected to the bottom face of the plate 10 by suitable means, such as the brackets 30, which may be welded to the opposite sides of the plate.

Surrounding the rear edge of the plate 10 is a depending guard 23 for preventing flying objects from injuring the operator of the lawn mower. This guard is recessed or notched at its rear portion, as indicated at 24, to permit the passage therethrough of the legs of a U-shaped, rear wheel fork 25 having its legs disposed in the notches and its bight engaging the under surface of the plate 10 and secured thereto by welding, the connection being made as indicated at 26, Figure 2. The fork 25 has inbent ends 27 on which a rear supporting wheel 28 is journaled.

On the top of the plate and extending rearwardly and upwardly therefrom is a tubular handle 29 having its lower end welded or otherwise rigidly secured to the supporting plate and through which extends a cable cord 31 connecting at its lower end with a switch 32 and which in turn is connected with the electric motor 12. At its upper end the handle has a transverse member 33 welded thereto, as indicated at 34. The transverse member closes the end of the portion 29, but has a transverse opening through which the cable 31 may extend.

While various changes may be made in the detailed construction, it shall be understood that such changes shall be within the scope and spirit of the present invention, as defined by the appended claim.

I claim:

In a lawn mower including a circular supporting plate having a central aperture therethrough, an axle extending across said plate at one side of said aperture, plate supporting wheels on said axle, a rear wheel, means mounting said rear wheel on said plate, a handle secured at its lower end to said plate adjacent said rear wheel mounting means and inclined upwardly and outwardly of said plate, a motor on said plate having a shaft extending downwardly through said plate aperture, means mounting said motor on said plate, and a cutting blade disposed below said plate and secured at its mid-length location to said motor shaft, a substantially semi-circular guard strip secured at its upper edge to the rearward edge of said supporting plate and extending downwardly from the latter, said rear wheel mounting means comprising a U-shaped fork having its bight secured to the under surface of said supporting plate within said guard strip and its legs extending outwardly past said guard strip, said guard strip having notches therein receiving said legs and said legs having inturned outer end portions received in the hub of said rear wheel.

MILTON B. DOWNER.

REFERENCES CITED

The following references are of record in the file of this patent:

UNITED STATES PATENTS

| Number | Name | Date |
| --- | --- | --- |
| Re. 18,944 | Beazley | Sept. 12, 1933 |
| 2,208,972 | Goodall | July 23, 1940 |
| 2,253,452 | Urschel | Aug. 19, 1941 |
| 2,302,472 | Power | Nov. 17, 1942 |
| 2,329,372 | Hitch | Sept. 14, 1943 |